United States Patent [19]

Liu

[11] Patent Number: 5,230,070
[45] Date of Patent: Jul. 20, 1993

[54] ACCESS AUTHORIZATION TABLE FOR MULTI-PROCESSOR CACHES

[75] Inventor: Lishing Liu, Pleasantville, N.Y.

[73] Assignee: International Business Machines Corporation, Armonk, N.Y.

[21] Appl. No.: 984,001

[22] Filed: Dec. 1, 1992

Related U.S. Application Data

[63] Continuation of Ser. No. 404,712, Sep. 8, 1989, abandoned.

[51] Int. Cl.$^5$ .............................................. G06E 13/00
[52] U.S. Cl. ............................ 395/425; 384/DIG. 1; 384/DIG. 2
[58] Field of Search ........................ 395/400, 425; 364/DIG. 1, DIG. 2

[56] References Cited

U.S. PATENT DOCUMENTS

| | | | |
|---|---|---|---|
| 4,136,386 | 1/1979 | Annunziato et al. | 364/200 |
| 4,142,234 | 2/1979 | Bean et al. | 364/200 |
| 4,394,731 | 7/1983 | Flusche et al. | 364/200 |
| 4,400,770 | 8/1983 | Chan et al. | 364/200 |
| 4,484,267 | 11/1984 | Fletcher | 364/200 |
| 4,503,497 | 3/1985 | Krygowski et al. | 364/200 |
| 4,513,367 | 4/1985 | Chan et al. | 395/425 |
| 4,622,631 | 11/1986 | Frank et al. | 364/200 |
| 4,716,528 | 12/1987 | Crus et al. | 395/650 |
| 4,755,930 | 7/1988 | Wilson, Jr. et al. | 364/200 |
| 4,775,955 | 10/1988 | Liu | 364/900 |
| 4,794,521 | 12/1988 | Ziegler et al. | 364/900 |
| 4,797,814 | 1/1989 | Brenza | 364/200 |
| 4,825,412 | 4/1989 | Sager et al. | 365/49 |
| 4,928,225 | 5/1990 | McCarthy et al. | 364/200 |
| 5,016,168 | 5/1991 | Liu | 364/200 |
| 5,023,776 | 6/1991 | Gregor | 364/DIG. 1 |
| 5,025,365 | 6/1991 | Mathur et al. | 395/600 |
| 5,029,070 | 7/1991 | McCarthy et al. | 395/425 |
| 5,055,999 | 10/1991 | Frank et al. | 364/200 |

OTHER PUBLICATIONS

L. M. Censier et al., "A New Solution to Coherence Problems in Multicache Systems," IEEE Transactions on Computers, Dec. 1978, pp. 1112–1118.

C. K. Tang, "Cache System Design in the Tightly Coupled Multiprocessor System", Proceedings of the AFIPS, 1976 pp. 749–752.

Atsuhiro Goto et al., Design and Performance of a Coherent Cache for Parallel Logic Programming Architectures, 1989 ACM.

Primary Examiner—Joseph L. Dixon
Assistant Examiner—Jack A. Lane
Attorney, Agent, or Firm—Whitham & Marhoefer

[57] ABSTRACT

A multi-processor (MP) system having shared storage is provided with locking of exclusivity status and read only status in multi-processor caches. The multi-processor system includes a plurality of processors, a shared main storage and a storage control element (SCE). The storage control element includes a global access authorization table (GAAT). Locking of exclusivity status in multi-processor caches is accomplished by providing at each processor a local access authorization table (AAT) containing access status for recently used data blocks wherein the size of a data block is a multiple of cache line size. The access status of a block in the local access authorization table is checked when the block is to be accessed by a processor. Only if the access status for a block is not found in the local access authorization table is authorization to access the block requested from the storage control element.

8 Claims, 5 Drawing Sheets

ACCESS AUTHORIZATION TABLE FOR MULTI-PROCESSOR CACHES

This application is a continuation of application Ser. No. 404,712 filed Sep. 8, 1989, now abandoned.

BACKGROUND OF THE INVENTION

1. Field of the Invention

This invention generally relates to control of cache memory coherence in a multi-processor (MP) data processing system and, more particularly, to an authorization mechanism that provides each processor precise authorization for accesses, either reads or writes.

2. Description of the Prior Art

High performance, MP computer systems are being developed to increase throughput by performing in parallel those operations which can run concurrently on separate processors. Such high performance, MP computer systems are characterized by multiple central processor (CPs) operating independently and in parallel, but occasionally communicating with one another or with a main storage (MS) when data needs to be exchanged. The CPs and the MS have input/output (I/O) ports which must be connected to exchange data.

In the type of MP system known as the tightly coupled multi-processor system in which each of the CPs have their own caches, there exist coherence problems at various levels of the system. More specifically, inconsistencies can occur between adjacent levels (i.e., first level caches, second level caches, etc.) of a memory hierarchy. The multiple caches could, for example, possess different versions of the same data because one of the CPs has modified its copy. It is therefore necessary for each processor's cache to know what has happened to lines that may be in several caches at the same time. In a MP system where there are many CPs sharing the same main storage, each CP is required to obtain the most recently updated version of data according to architecture specifications when access is issued. This requirement necessitates constant monitoring of data consistency among caches.

A number of solutions have been proposed to the cache coherence problem. Earlier solutions are described by C. K. Tang in "Cache System Design in the Tightly Coupled Multiprocessor System", *Proceedings of the AFIPS* (1976), and L. M. Censier and P. Feautrier in "A New Solution to Coherence Problems in Multicache Systems", *IEEE Transactions on Computers*, December 1978, pp. 1112 to 1118. These proposals allow shared writable data to exist in multiple caches which use a centralized global directory. The global directory stores the status of memory blocks so that cache cross-interrogates (XI) can be generated on the basis of the block status. To maintain consistency, XI signals are propagated with associated block addresses to other caches to either invalidate (INV) or update the referenced block. Any number of caches may have read only (RO) copies of a block, but to modify a block in its cache, a processor must have read and write (RW) access. A block is tagged as exclusive (EX) if the cache is the only cache that has a copy of that block. Tang proposed using local cache copy directories as the global directory, which is located in the storage control element (SCE) that may also incorporate the crossbar switch that interconnects the processors and the memory devices. Censier et al. proposed using memory flags for the recording of storage block status instead.

There are various types of caches in prior art MP systems. One type of cache is the store through (ST) cache as described in U.S. Pat. No. 4,142,234 for IBM System/370 Model 3033 MP. ST cache design does not interfere with the CP storing data directly to the main storage (or second level cache) in order to always update changes of data to main storage. Upon the update of a store through to main storage, appropriate cross-interrogate (XI) actions may take place to invalidate possible remote copies of the stored cache line. The storage control element (SCE) maintains proper store stacks to queue the main storage (MS) store requests and standard communications between buffer control element (BCE) and SCE will avoid store stack overflow conditions. When the SCE store stack becomes full, the associated BCE will hold its MS stores until the condition is cleared. In U.S. Pat. No. 4,142,234, Bean et al. proposed a BIAS filter memory mechanism for filtering out unnecessary invalidate interrogations of cache directories.

Another type of cache design is the store-in cache (SIC) as described, for example, in U.S. Pat. Nos. 3,735,360 to Anderson et al. and 4,771,137 to Warner et al. A SIC cache directory is described in detail in U.S. Pat. No. 4,394,731 to Flusche et al. in which each line in a store-in cache has its multi-processor shareability controlled by an exclusive/read only (EX/RO) flag bit. The main difference between ST and SIC caches is that, all stores in SIC are directed to the cache itself (which may cause a cache miss if the stored line is not in the SIC cache). It is also proposed in U.S. Pat. No. 4,503,497 that data transfers upon a miss fetch can take place through a cache-to-cache transfer (CTC) bus if a copy is in the remote cache. A SCE is used that contains copies of the directories in each cache. This permits cross-interrogate (XI) decisions to be resolved at the SCE. Usually, cache line modifications are updated to main storage only when the lines are replaced from the cache.

In conventional cross-interrogate (XI) methods, when a block B is locked EX for CP $P_i$, any existing cache lines covered by B in remote caches will be invalidated. When the block size is bigger than first level cache line size, this often results in redundant XI-invalidates; i.e., lines get invalidated without being modified at other CPs. The overhead due to extra cache misses and directory handling becomes intolerable when the block size is much (e.g., 16 times) bigger than the line size.

From experiments, significant spatial localities have been observed for both fetches and stores. By performing EX locking with bigger granularity blocks, a significant reduction in the rate of Non-EX-stores can be achieved. As a result, it is valuable to be able to perform large granularity EX locking without causing the above-mentioned performance overhead.

In conventional MP designs, the status (e.g., RO, EX, etc.) of a cache line is recorded using status bits at the directory of the cache. A valid cache line is normally at least readable, if not immediately writable by the CP. For example, consider the cache design of IBM 3081 MP systems. When a valid cache entry is not exclusive (when the EX bit in the associated directory entry is OFF) the line is considered read only (RO) automatically and can be read from the associated CP. There is no known prior art in which all accesses (both read and write) to a valid cache line will need to go through separate authorization mechanisms.

SUMMARY OF THE INVENTION

It is therefore an object of the present invention to provide an authorization mechanism that provides each processor in a multi-processor system precise authorization for accesses, reads or writes, thereby simplifying the control of cache coherence.

According to the invention, the BCE keeps track of access authorizations of blocks by maintaining an Access Authorization Table (AAT). The AAT is a directory recording RO and EX states for recently used blocks. Other than a validity bit, each entry of the AAT contains a block ID field and records whether the entry is RO or EX. A block accessed by a CP will be regarded as temporarily invalid (TI) if not found in its local AAT. Each processor BCE uses information in its local AAT to determine the access authorization for data blocks. The size of a block may be a multiple of the cache line size. Each entry of an AAT contains the access status; e.g., INV, RO, EX, TI, etc. Each cache access will require either RO or EX authorizations. The SCE maintains enough information (e.g., all EX authorizations) to resolve authorization requests from processors.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
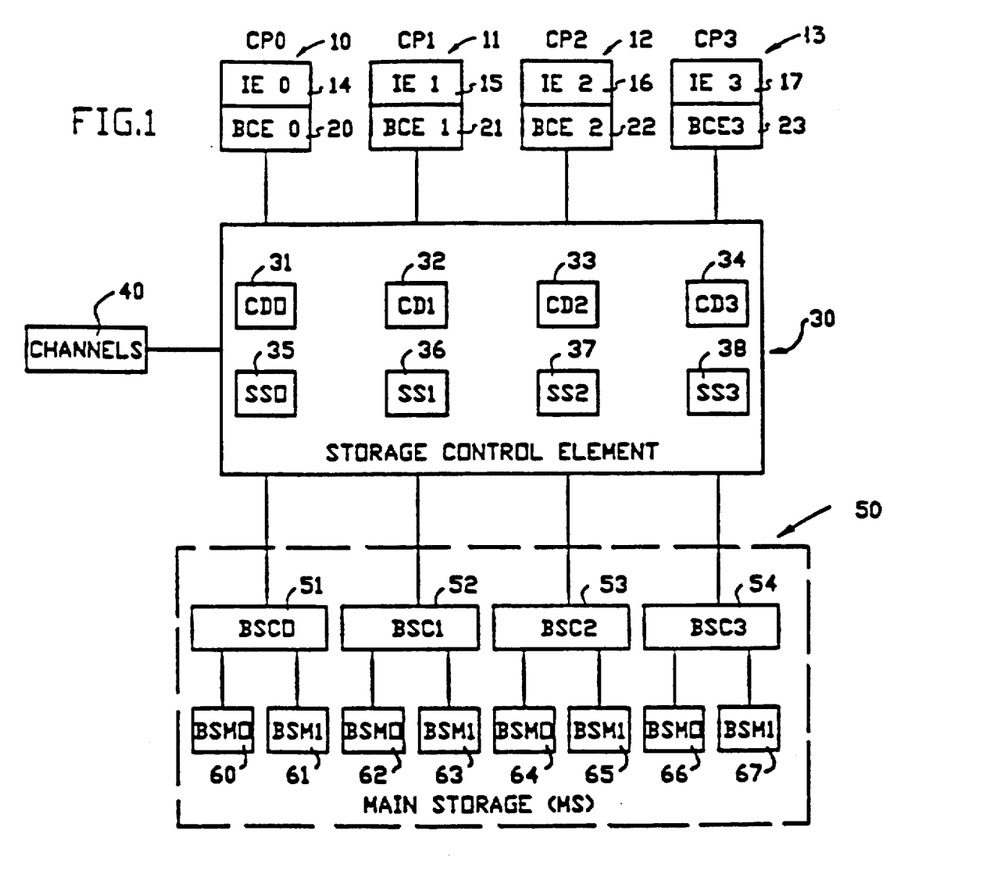
FIG. 1 is a block diagram of a multi-processing system in which the present invention may be used.

Referring now to the drawings, and more particularly to FIG. 1, there is illustrated in block diagram form a multi-processor (MP) system of the type in which the invention may be used. The MP system comprises four central processors ($CP_0$, $CP_1$, $CP_2$, and $CP_3$) 10, 11, 12, and 13 in which each CP includes an instruction execution (IE) unit 14, 15, 16, and 17 and buffer control unit (BCE) 20, 21, 22, and 23, respectively. Each IE includes hardware and microcode that issue instructions that require the fetching and storing of operands in main storage (MS) 50.

The IEs 14–17 begin a fetching or storing operation by issuing a fetch or store command to their respective cache controls BCEs 20–23, which include a processor store through (ST) cache with its associated processor cache directory (PD) and all processor cache controls which are exclusively used by their associated CPs 10–13. The CP generally issues a fetch or store command for each doubleword (DW) unit required by an operand. If the cache line containing the DW is in the PD, which is a cache hit, the DW is fetched or stored in the cache in accordance with the command. For an operand fetch hit in cache, the storage access is completed without any need to go outside of the BCE. Occasionally, the required DW is not in the cache, which results in a cache miss. Before the IE fetch or store command can be completed, the DW must be fetched from the main storage. To do this, the BCE generates a corresponding fetch or store miss command which requests the storage control element (SCE) 30 to obtain from main storage 50 a line unit of data having the DW required by the IE. The line unit will be located in the main storage 50 on a line boundary, but the required DW will be the first DW in the fetched line to be returned to the requesting BCE in order to keep the IE request going before the completion of the missed line transfer.

SCE 30 connects to the CPs 10–13 and main storage 50. Main storage 50 is comprised of a plurality of basic storage module (BSM) controllers $BSC_0$, $BSC_1$, $BSC_2$, and $BSC_3$ (51, 52, 53, and 54, respectively) in which each basic storage controller connects to two BSMs 0 (60, 62, 64, and 66) and 1 (61, 63, 65, and 67). The four BSCs 51–54 are each connected to the SCE 30.

SCE 30 contains four copy directories (CDs) 31, 32, 33, and 34, each containing an image of the contents of a corresponding processor cache directory (PD) in one of the BCEs in a manner similar to that described in U.S. Pat. No. 4,394,731 to Flusche et al. Both PD and CD are addressed by the same bit positions from the logical address. The CDs handle all cross-invalidates (XI) requests and can thereby better service their respective CPs. A doubleword wide bidirectional data bus is provided between each BSM 60–67 in main storage and corresponding SCE port, and from SCE ports to I/O channel processor 40 and each of the corresponding CPs 10–13. Along with the data busses there are also separate sets of command busses for control and address signals. When a CP encounters a cache miss for a DW access request, its BCE initiates a line access request to main storage by sending a miss command to SCE 30, which then reissues the command to a required BSM in main storage. In the event of a BSM busy condition, SCE 30 will save the request in a command queue and will reissue it at a later time when the required BSM 60–67 becomes available. SCE 30 also sequences the main storage commands in an orderly fashion so that all commands to a particular BSM are issued in first-in-first-out (FIFO) order, except when a cache conflict is found by its XI logic. During the normal sequence of handling a main storage request, SCE 30 constantly monitors the status of main storage, analyzes the interrogation results of protection key and all cache directories, examines updated status of all pending commands currently being held in SCE 30, and also looks for any new BCE commands that may be waiting in BCE 20–23 to be received by SCE 30.

SCE 30 maintains a plurality of store stacks ($SS_0$, $SS_1$, $SS_2$, and $SS_3$) 35, 36, 37, and 38, each for holding of main storage store requests of up to 16 DWs for a corresponding CP. SCE 30 keeps enough directory information for the store stacks for the indication of main storage addresses and validity. When a store stack risks overflow SCE 30 sends a priority request to the associated BCE 20–23 to hold the sending of more store requests until the BCE receives a later signal from SCE 30 clearing the store stack full condition. Data in the store stacks are updated to main storage with appropriate scheduling maintaining the incoming order within each store stack. A line fetch request from a CP is held by SCE 30 until the SCE makes sure that all existing stores to the line in the store stacks have been sent to the associated BSM 60–67.

Figure 2:
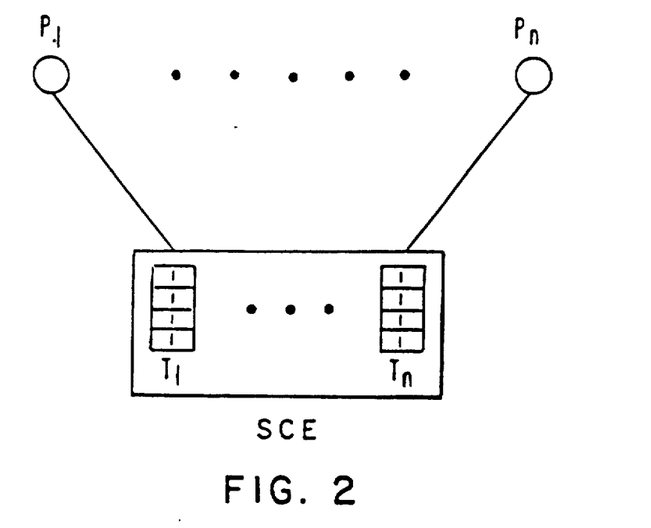
FIG. 2 is a block diagram showing that portion of the multi-processing system of FIG. 1 comprising a plurality of processors and the storage control element (SCE), illustrating lock tables for each processor.

The conventional way of recording EX states in cache directory entries can be quite costly. For instance, consider a second level cache with 32K entries. If the SCE maintains three bits per second level cache entry for the EX status, it requires 100K bits, plus the required bits in first level cache directories. It is possible to reduce such circuit costs by using relatively small lock tables $T_1$ to $T_n$, as illustrated in FIG. 2. In the MP system of FIG. 2, for each processor $P_i$, the SCE maintains a lock table $T_i$, which is normally structured as a set-associative table indexed (or hashed) via addresses. For each entry of lock table $T_i$, there is an ID field (plus an appropriate validity tag), which records the address of a block (B). Each entry of lock table $T_i$ represents the EX locking of a block for $P_i$. Initially, all entries in the lock tables are invalid. The block size b need not be the same as the (first level or second level) cache line size, although it is normally an integral multiple of the cache line size.

Consider the store synchronization mechanism at the SCE for conventional ST caches, in which each store from a processor $P_i$ needs to be synchronized with the SCE. The basic operations at the SCE are as follows. First consider the handling by the SCE for store synchronization request (on block B) from processor $P_i$:

(a.1) When block B hits in lock table $T_i$—The store synchronization is granted to processor $P_i$ immediately.

(a.2) When block B is not in any of the lock tables—The SCE creates a new entry for block B in lock table $T_i$ and grants the store synchronization to $P_i$. In parallel to the above process, the SCE also sends out signals (to CPs that may contain data of block B in their caches) to XI-invalidate all lines of block B from remote caches.

(a.3) When block B hits to lock table $T_j$ (j=/i)—This is similar to Remote-EX-hit at the SCE. In this case, the entry of block B is deleted from lock table $T_j$ while a new entry is created in lock table $T_i$ (with XI-invalidate signal sent to processor $P_j$).

Then consider the operations when the SCE receives a fetch request (e.g., cache miss) for a block B from processor $P_i$.

(a.4) When block B is not recorded at any remote lock table $T_j$—The fetch can be initiated without delay.

(a.5) When block B hits to lock table $T_j$ (where j=/i)—The block B entry is invalidated from lock table $T_j$ first.

Among the above steps, (a.1) may be done in parallel for multiple stores from different CPs. Proper serialization may be needed at the SCE when other steps are executed, although this does not preclude the possibility of performing more than one store synchronization request in the same cycle. As the locking granularity b becomes bigger (e.g., 4K), the XI-invalidates, from steps (a.2) and (a.3), will cause severe level one cache misses.

The EX lockup mechanism described above is different from the BIAS (buffer invalidation address stack) filter memory method proposed by Bean et al. in U.S. Pat. No. 4,142,234. In the BIAS filter memory scheme, the SCE maintains, for each processor $P_i$, a table $I_i$ that records the blocks which have been recently invalidated from processor $P_i$ without refetching. Each store request from processor $P_i$ needs to be checked against all tables $I_j$ (j=/i) simultaneously for XI-invalidate possibilities. As the number of processors grows, this simultaneous checking becomes a heavy burden. In the EX lock table approach, most stores will hit to the table $T_i$ associated with processor $P_i$, and hence with much higher concurrency in SCE handling. Furthermore, at any moment of time, a recently stored block ID will reside in most of the remote $I_j$ tables in the BIAS approach. The $T_j$ tables record only the recent stores from the respective CPs, and are disjoint from each other (except for invalid entries). As a result, the $T_j$ tables can utilize circuits more effectively.

Figure 3:
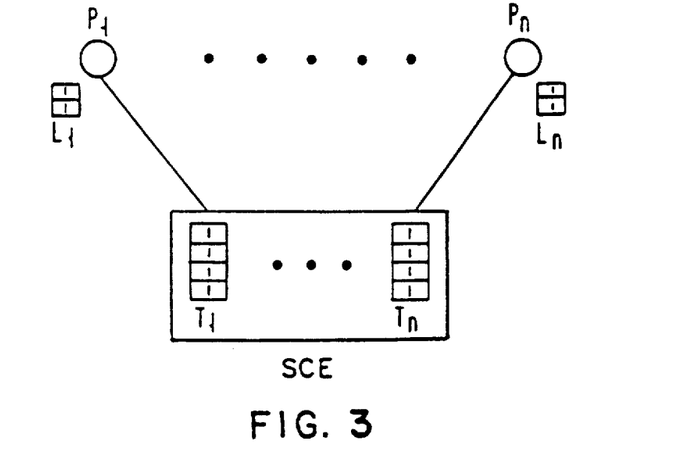
FIG. 3 is a block diagram similar to FIG. 2 showing local lock tables at the processors.

In future processors, in which pipelines are pushed much harder, the delay of store synchronization can be rather costly to pipeline performance. Therefore, it is beneficial to provide proper EX locking at the BCE level so that frequencies of store synchronization to SCE may be reduced. In the above described SCE lockup design, a block locked in table $T_i$ actually means that it cannot reside in any of the remote caches (for processor $P_j$, j=/i). If such locking information is passed to the BCE, it is possible to eliminate the handshake with the SCE for stores to locally locked blocks. In FIG. 3, a local lock table $L_i$ is maintained by the BCE for each processor $P_i$. Each entry of local lock table $L_i$ records the ID of a block that is locked to EX by processor $P_i$. Normally, local lock table $L_i$ does not have more entries than lock table $T_i$. The operations for stores and locking is as follows:

(b.1) Initially all entries in local lock table $L_i$ are invalid.

(b.2) When a store from processor $P_i$ hits to a block B locked in local lock table $L_i$—The store may be carried out without delay.

(b.3) When a store to block B from processor $P_i$ misses in local lock table $L_i$—The BCE sends a synchronization request to the SCE. Upon receiving the granting signal from the SCE, a valid entry from block B is created in local lock table $L_i$.

(b.4) When processor $P_i$ receives a release request for block B from the SCE—The BCE of processor $P_i$ invalidates the entry of block B from local lock table $L_i$, if such an entry is found. An acknowledge signal is sent to the BCE.

As far as the BCE is concerned, no special handling is required for usual fetches (non-EX type). As far as the SCE is concerned, one major difference is on the handling of Remote-EX-hits. Consider the situation in which an access to block B from processor $P_i$ hits to lock table $T_j$, where j=/i.

(b.5) The SCE signals processor $P_j$ to release the EX lock on block B, if block B is possibly locked in local lock table $L_j$. (Note that lock table $T_j$ is not prevented from carrying more lock entries than local lock table $L_j$.) This signal may be coupled with appropriate XI-invalidate request (e.g., when the access from processor $P_i$ is for EX status). The SCE does not complete such XI action until it receives the acknowledge signal from processor $P_j$ (see (b.4)).

It is desirable to keep the locking information in local lock table $L_i$ a subset to that in lock table $T_i$. It suffices to guarantee that, when an entry is deleted from lock table $T_i$, the corresponding block will not exist in local lock table $L_i$. An entry of lock table $T_i$ may be deleted from lock table $T_i$ due to two reasons, XI and replacement due to local request. The XI handling (e.g., (b.5)

above) does preserve the subset rule properly. For local replacements, it is clear that, an entry is replaced from lock table $T_i$ only due to an EX request from processor $P_i$.

The foregoing assumes conventional XI-invalidate methods; that is, when a block B is locked EX from processor $P_i$, any existing level one cache lines covered by block B in remote caches will be invalidated. When the block size is bigger than the processor cache line size, this often results in redundant XI-invalidates (i.e., lines get invalidated without being modified at other CPs). The overhead due to extra cache misses and directory handling becomes intolerable when the block size is much (e.g., sixteen times) bigger than the line size. One approach in relieving this problem is the use of special S-vectors (store vectors) at lock tables to filter out repeated XI-invalidates. For instance, consider the enhancement of such a S-vector at each $T_i$ table entry at the SCE. Each S-vector has as many bits as the number of cache lines within a block. When an entry is created at lock table $T_i$, which authorizes processor $P_i$ to store into a block B, the corresponding S-vector bits are cleared. When a store to the k-th line of block B from processor $P_i$ finds the k-th bit of the associated S-vector OFF, the SCE will turn the bit ON and send out signals to proper remote caches to invalidate the line being stored. In essence, the k-th bit of the S-vector is an indicator on whether remote invalidation of the associated line has been carried out previously.

From experiments, significant spatial localities have been observed for both fetches and stores. Performing EX locking with bigger granularity blocks is able to reduce the rate of Non-EX-stores significantly. As a result, it is valuable to be able to perform large granularity EX locking without causing the above-mentioned performance overhead. In the following description, for simplicity of presentation, exclusive locking granularity is illustrated by 4K blocks in a multi-processor system with 128 bytes per cache line. In such a case, there are 32 lines in each block. However, it will be understood that these numbers are by way of example only and that different sized blocks, lines and caches may be used in the practice of the invention. Also, for purposes of this description, a store through (ST) cache design is assumed with the SCE keeping track of the exclusive (EX) ownership of storage blocks by each of the several processors in the system. It is also assumed that at each central processor (CP), there is a directory (DP) to keep track of block information.

One way for the BCE to keep track of access authorizations of blocks of data is to maintain an Access Authorization Table (AAT). The basis for the AAT design according to the invention is the observation that, with big blocks, both fetches and stores can be highly covered with a relatively small number of most recently used blocks. For instance, the table below provides the cumulative hit ratios, for both fetches and stores, to a directory managed by LRU (least-recently-used) replacement policy with block size 4K.

TABLE

| Stack Depth | Hit Ratio |
| --- | --- |
| 1 | .4771 |
| 2 | .7740 |
| 4 | .9189 |
| 8 | .9635 |
| 16 | .9799 |

TABLE-continued

| Stack Depth | Hit Ratio |
| --- | --- |
| 32 | .9873 |

Figure 6:
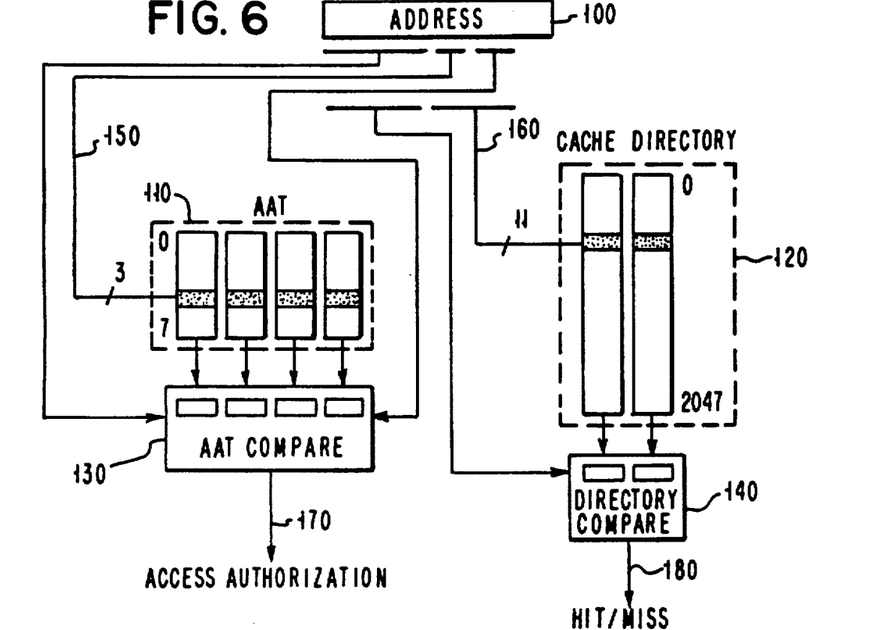
FIGS. 6, 7 and 8 are illustrative of the operation and architecture of the invention.
Figure 7:
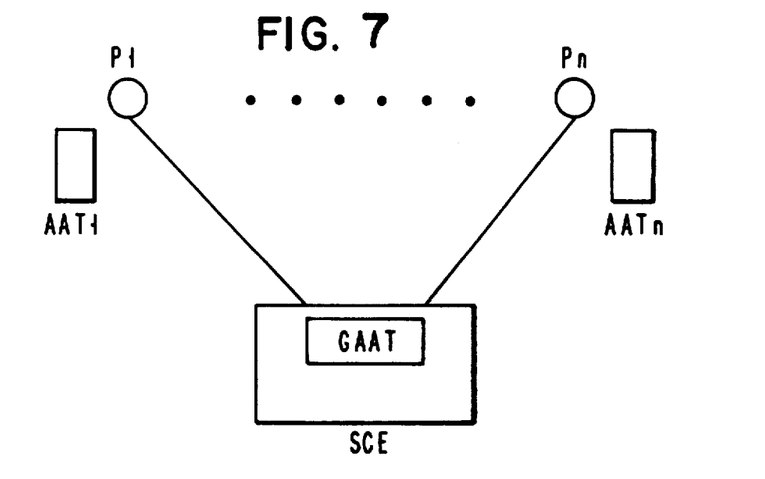
Figure 8:
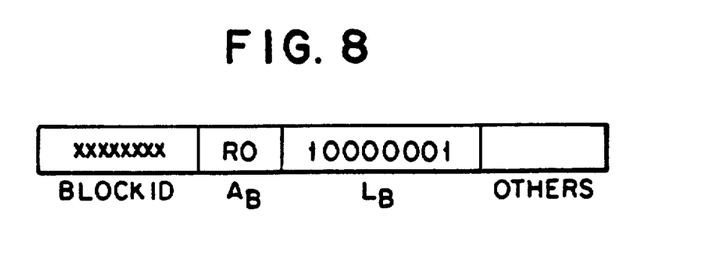

Let N be the number of processors. Each processor has its own private (local) cache(s). The relationship between the local AAT and the cache directory at each BCE is depicted in FIG. 6. For examle, the cache is 2-way set-associative with a total of 4096 line entries. (Hence, there are 2048 congruence classes, each containing two line entries.) At the cache directory 120, each entry records the address identifier for the line and a validity-bit indicating whether the line slot is currently empty or not. The AAT 110 at the BCE is 4-way set associative with a total of 32 entries. (Hence there are eight congruence classes, each containing four block entries.) For any given cache access to ADDRESS 100, the AAT 110 and the cache directory are interrogated in parallel. Certain 11 bits 160 in ADDRESS 100 are used to select a congruence class, from which the two directory entries are read out to a directory compare 140 unit. At the directory compare 140, conventional methods are utilized to determine whether the line address is matched with one of the two entries in the selected congruence class. When such an address match is found, against a valid directory entry, a cache hit condition results. Otherwise, a cache miss results. The output 180 of the directory compare 140 provides the hit/miss results. The AAT 110 is interrogated in a similar manner. Three address bits 150 are used to select one of the eight AAT congruence classes, from which the four block entries are read out to an AAT compare 130 unit, which determines whether a valid address match to the currently accessed block exists. The output 170 also provides the recorded authorization for the current cache access if a match is found. It may occur that the cache directory 120 indicates a cache hit condition while the AAT 110 does not provide the needed access authorization (e.g. when the block entry is missing in AAT 110). A logical Global AAT (GAAT) at the SCE has entries that contain information for one or more storage blocks (FIG. 7). For each block B recorded, there is the following information: (1) the block ID (i.e., the address of block B); (2) an authorization tag $A_B$; and (3) a bit-vector $L_B$ for the assignment of authorization. FIG. 8 depicts a block entry at GAAT such that the block is recorded as having RO status assigned to the first and the last processors in a system with eight processors (e.g. n=8). The tag $A_B$ indicates status like INV, RO and EX. There is one bit per processor in vector $L_B$, indicating which of the processors are granted current authorization. All EX assignments should be reflected in GAAT (i.e., the subset rule is enforced on EX states). Depending on design, the subset rule may not be enforced on RO assignments (i.e., a block B may be RO at the AAT at a processor, while the block B entry may not be in GAAT). However, when a valid RO entry for block B is present in the GAAT, all RO assignments should be conservatively, if not exactly, indicated in vector $L_B$; i.e., the i-th bit of vector $L_B$ should be ON when processor $P_i$ is authorized RO on block B. When block B is not recorded in GAAT, the possibility that block B can be RO in any of the local AATs can be considered. The operations are the following:

(c.1) Initially GAAT and all AATs contain null information.

(c.2) When a block B entry is inserted into GAAT (via a request from a processor), it is initialized as if RO with all bits ON in vector $L_B$. (All vector $L_B$ bits are OFF if the subset rule is enforced on RO also.)

(c.3) Upon replacement decision at GAAT, EX block entries are given higher priority for staying in cache. However, if an EX block entry needs to be replaced, the SCE signals the processor holding the EX status to give it up before finishing up the replacement operation. (If the subset rule is also enforced for RO, replacing a RO entry from GAAT also requires the SCE to signal relevant processors to release the status, although the replacement may not need to wait for the acknowledgements of such releases.)

(c.4) When processor $P_i$ acquires RO authorization on block B, the i-th bit of vector $L_B$, at GAAT, is turned ON. Tag $A_B$ indicates RO.

(c.5) When processor $P_i$ acquires EX authorization on block B, the i-th bit of vector $L_B$, at GAAT, is turned ON and the rest are turned OFF. Tag $A_B$ indicates EX.

(c.6) When processor $P_i$ releases EX state on block B, a tag $A_B$ indicates the new state.

(c.7) When processor $P_i$ releases RO state on block B, the i-th bit of vector $L_B$ is turned OFF at the GAAT, if present there. However, certain designs may not cause the signaling of such release to the SCE, in which case vector $L_B$ is not updated.

As usual, XI actions are needed for certain EX status handling, as follows:

(c.8) When a processor acquires EX state on block B, all remote processors with their vector $L_B$ bit ON, at GAAT, should be notified for invalidating of the authorization from their AAT. Such signaling may be in parallel with the EX granting if tag $A_B$ originally indicated RO.

(c.9) When an authorization request for block B from processor $P_i$ finds, at the SCE, the block EX for another processor, the granting of authorization should wait until the remote processor has given up its EX control. Any stores into block B from the remote processor not yet reflected at the next level shared memory (cache) should block subsequent miss fetches, unless some other mechanisms can guarantee the architecture impact on fetching such data.

When the size of the GAAT is big enough, it is also possible to enhance the information at each GAAT entry to optimize the handling of cache line invalidations. Normally, a store to a line from a processor may trigger cache invalidates to remote caches. Multiple stores into the same block may result in multiple invalidates. Each block entry of the GAAT may be associated with a set of V-vectors (valid vectors). At each entry for block B of GAAT, there is a V-vector $V_{PB}$ for each processor P. There is one bit per line within the block in such a V-vector. The i-th bit in vector $V_{PB}$ indicates the validity of the i-th cache line in block B for the cache(s) at processor $P_i$. We also enhance the local AAT at each processor cache control with such V-vectors. Let $A_i$ be the AAT at processor $P_i$. Each entry of table $A_i$ is now enhanced with a V-vector, which consists of one bit per line within the block recorded there. When a block entry is missing from the GAAT, all V-vectors are considered OFF by the SCE; i.e., as far as the SCE is concerned, all lines within the block are considered invalid at each cache, even when these lines may be resident in some caches. When the entry for block B is not in the GAAT, the SCE treats block B as potentially RO for any of the processors, if the subset rule is not enforced for RO authorizations. As described here, the SCE also thinks as if all lines of block B are invalid in all the caches; hence, when an entry of block B is inserted to GAAT upon an authorization request, all vectors $V_{PB}$ are initialized as 0-bits. However, as will be shown subsequently, in such situations, some of the blocks may still have RO rights on block B, with copies of old V-vectors, and think of some lines as valid in their caches.

The basic operations of the cache line validity control is as follows:

(d.1) When an entry for block B is inserted to GAAT upon an authorization request from a processor, the $V_{PB}$ vectors are initialized as 0-bits for all processors $P_i$. Also, as in (c.2), all bits of vector $L_B$ are turned ON at the GAAT to indicate the possibility of RO access authorization to block B from all CPs. (All bits of vector $L_B$ are OFF if subset rule is enforced for RO as well.)

(d.2) When SCE grants access authorization, EX or RO, on block B, the V-vector $V_{PB}$ is copied over and recorded in the local AAT of processor $P_i$. If the entry for block B already exists at the local AAT (e.g., with RO status), the V-vector $V_{PB}$ received from the SCE is ORed into the existing local V-vector.

(d.3) Upon a miss fetch of a line to a processor cache, the corresponding bit in the associated V-vector at GAAT and at local AAT is turned ON.

(d.4) When processor $P_i$ stores into the i-th line of block B, the i-th bit is turned OFF in each V-vector $V_{PB} (P = /P_i)$.

(d.5) Any access from a processor to a line with the corresponding bit OFF in the associated V-vector in AAT is treated as a cache miss, although the line may be clean in the cache.

Figure 4A:
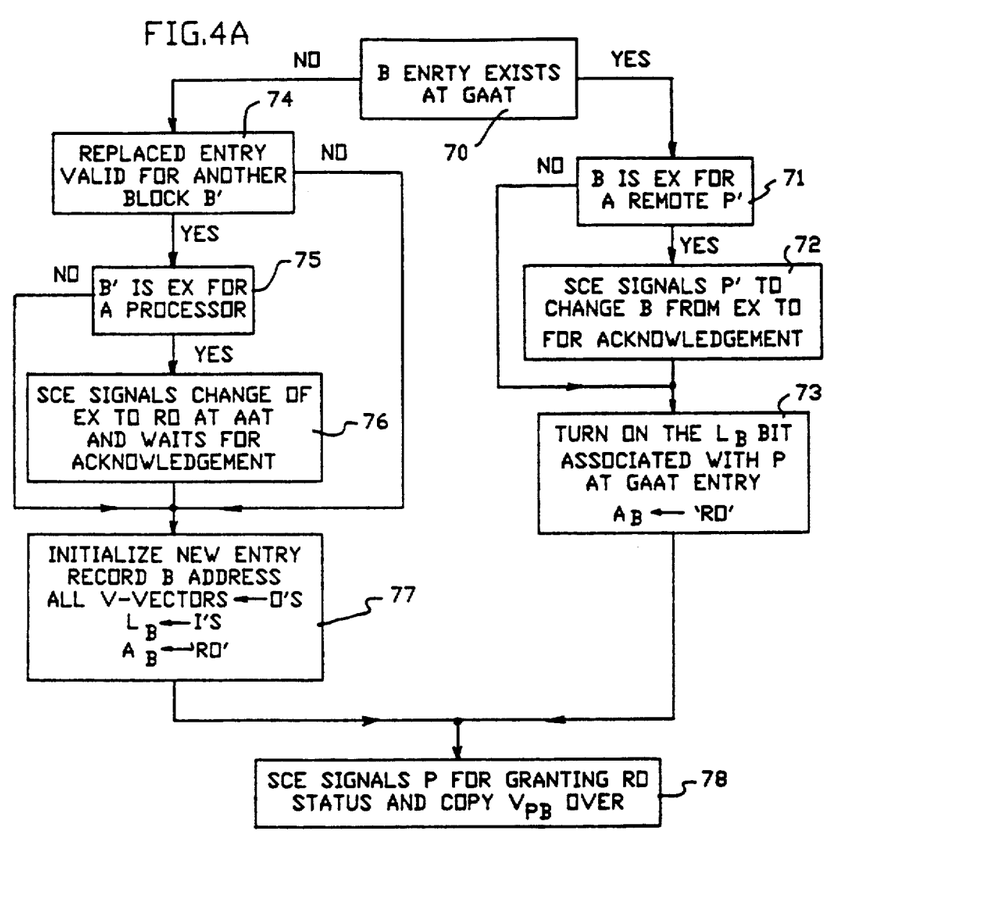
FIGS. 4A and 4B are flow charts showing, respectively, SCE operations for RO and EX access authorization request to block B from processor CP, according to the invention.

The SCE operations for handling a request for RO access authorization to block B from processor $P_i$ is described in the flow chart of FIG. 4A. In the RO access authorization, if an entry for block B exists at GAAT, as determined by decision block 70, a test is made in decision block 71 to determine if block B is EX of a remote processor P'. If so, the SCE signals the remote processor P' to change block B from EX to RO status and then waits for an acknowledgement from the remote processor, as indicated in function block 72. On the other hand, if block B is not EX for a remote processor or when an acknowledgement is received in function block 72, the SCE turns ON the vector $L_B$ bit associated with processor P at GAAT entry, tag $A_B$ is set to "RO". For this asynchronous invalidation of remote RO authorization as illustrated in FIG. 4A, proper timing control of the physical design is assumed to ensure that remote processors receive the invalidate signals no later than the receiving of EX status by requesting processor P.

Figure 4B:
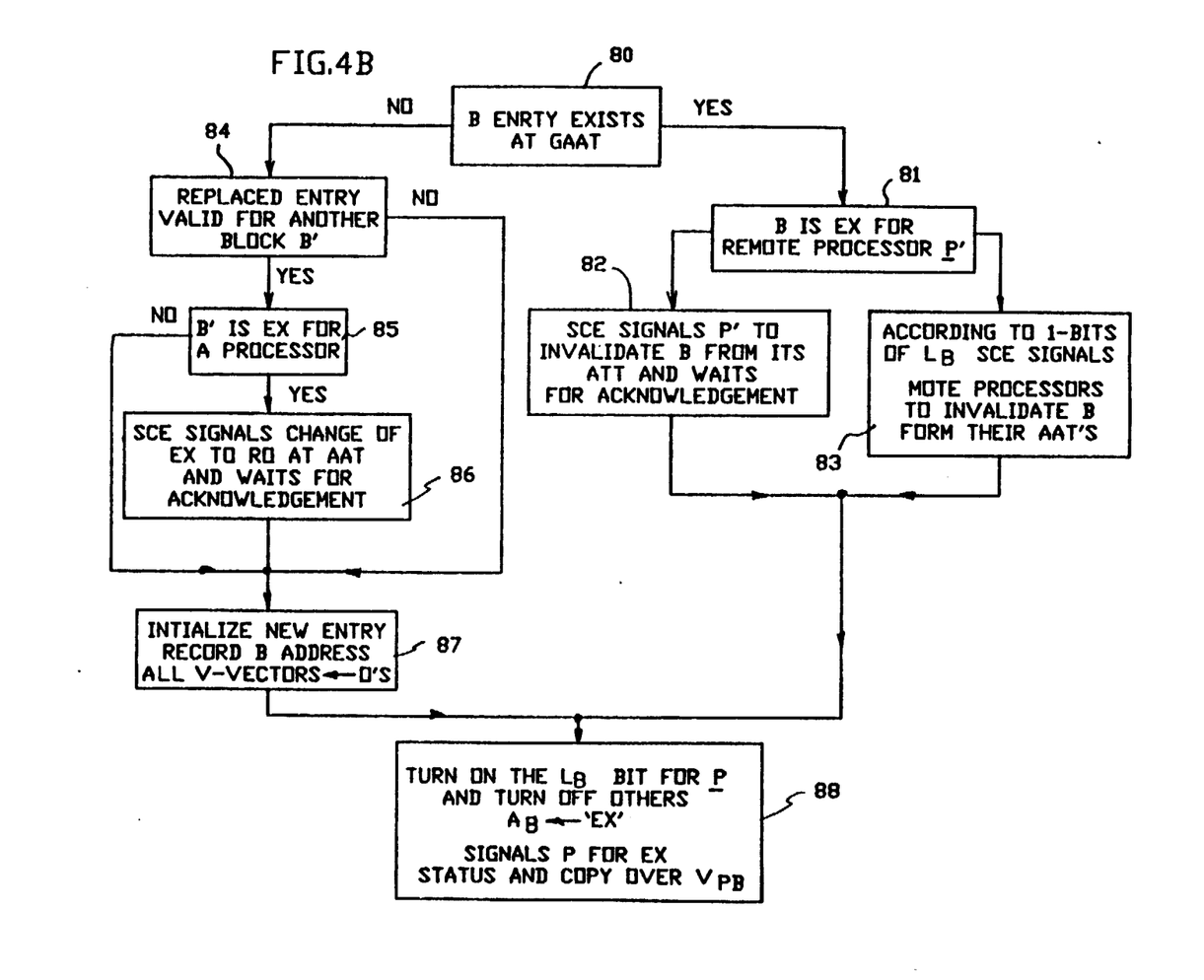

FIG. 4B contains the corresponding flowchart for request for EX access authorization request. For an EX request illustrated by the flowchart of FIG. 4B, all access authorizations to block B at remote processors should be invalidated before the requesting processor P gets EX status. Therefore, assuming an entry exists at GAAT, as determined by decision block 80, a test is made in decision block 81 to determine if block B is EX for a remote processor P'. If block B happens to be authorized EX to remote processor P', the SCE will confirm the invalidation of block B from the remote AAT before processing the new entry in order to protect against possible on coming stores into block B from processor P', as indicated by function block 82. On the other hand, if block B is owned RO by remote processors, the SCE may synchronously process the granting of EX status to processor P in parallel to the signaling of invalidation of block B to remote processors, as indicated by function block 83.

In both the RO and EX access authorization illustrated in FIGS. 4A and 4B, when a new entry for block B needs to be inserted at GAAT, a test is made in decision block 74 or 84 to determine if the replaced entry is valid for another block B'. If so, the SCE checks in decision block 75 or 85 to determine whether the replaced entry records an EX for block B'. If so, the SCE synchronously waits for the release of EX status from the owning processor in function block 76 or 86.

A more sophisticated design may avoid such synchronous waiting for EX status release. For instance, the SCE may maintain special registers recording those EX access authorizations that are being replaced from GAAT and still not confirmed by their own processors. The purpose of such special registers are to enable the SCE to properly handle activities related to these fading EX status before their final release.

In any case, once the EX status from the owning processor is released, or if the tests in decision blocks 75,85 or 76,86 are negative, the new entry is initialized in function block 77 and 87. The block B address is recorded and all V-vectors are set to 0s. In addition, in function block 77, vector $L_B$ is set to 1s and tag $A_B$ is set to "RO". At this point, both processes exit. In the case of an RO access authorization request shown in FIG. 4A, the SCE signals processor P for granting the RO status and copies vector $V_{PB}$ over in function block 78. In the case of an EX access authorization request shown in FIG. 4B, the SCE turns ON the vector $L_B$ bit for processor P and turns OFF all others. Tag $A_B$ is set to "EX", and the SCE signals processor P for EX status and copies over vector $V_{PB}$.

The advantage of the V-vectors is that stores no longer need to be notified to remote caches on individual line basis. Before a processor can store into a block B, it must acquire EX status on block B first, which will automatically forbid other processors from accessing block B. When another processor wants to access block B, it must obtain proper authorization first, by which time the invalidated lines are already reflected at the V-vector for the remote processor at GAAT. Another benefit is that, other types of cache invalidates (e.g., MVCL instruction processing or channel stores) need not interfere with the BCEs immediately. What is needed for such invalidates is simply a search through the GAAT to turn OFF proper bits in V-vectors, unless the blocks are being granted access authorizations to processors at the moment. In the latter case, the handling is similar to the granting of EX status, but not to any processor. With this type of design, it is not necessary to use the copy directories (CD) at the SCE that was assumed for the SCE's knowledge of line contents at individual caches. The logic for the process according to the invention is illustrated in the flow diagrams of FIGS. 4A and 4B.

As illustrated above, when the subset rule is not enforced for RO status, a block can be recorded as RO at a local AAT while GAAT does not have the block entry. In this case, line in block B may be indicated as valid at local AAT of processor P when a new block entry for block B is created at GAAT with all 0-bits initialized in the $V_{PB}$ vector, as described in step (d.1). It is a design option to have the V-vector at a RO block entry being replaced from a local AAT sent to the GAAT for merging extra validity bits. This option may not be needed in practice, since a reasonable design should normally maintain very high block hit ratio at the GAAT.

In a straightforward implementation, the cache miss condition may be determined from the V-vectors at local AAT and result in unnecessary performance delays in line fetch processing. For instance, consider the situation of a fetch by a processor P to a line resident in its local cache, while the access authorization to the associated block is missing in its local AAT. In step (d.2) the BCE may obtain the RO access to the block B and determine the invalidity of the line from the V-vector $V_{PB}$ obtained from the SCE and issue a subsequent line miss fetch request to the SCE. In this situation, the BCE may issue the access authorization request. When the SCE determines that the line is invalid for processor P, by examining the associated vector $V_{PB}$ from GAAT, it may schedule a line miss fetch to processor P immediately to reduce the leading-edge delay.

Figure 5:
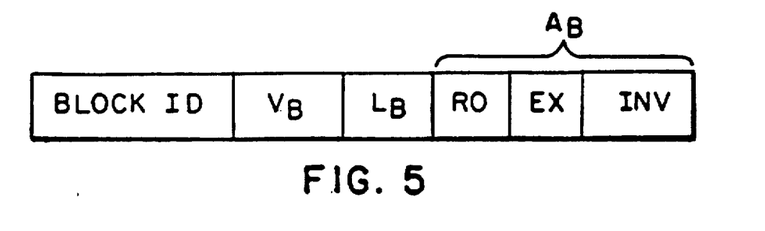
FIG. 5 is a block diagram which illustrates the format of a block entry of in GAAT or AAT with four sub-blocks, according to the invention.

It is also possible to modify the above described access authorization design to improve sharing of data a finer granularity than a block. For instance, each block may be divided into sub-blocks and the status (INV-/RO/EX) may be recorded at sub-block granule. FIG. 5 illustrates the format of a block entry in GAAT or AAT with four sub-blocks. The $V_B$-bit indicates the validity of the whole block entry, and the status of four sub-blocks are recorded accordingly.

Although there has been described the access authorization mechanism in terms of particularly tightly-coupled multi-processor systems, it is possible to apply similar techniques to other system environments. For example, consider multiple systems sharing storage. The schemes proposed in this invention may be properly modified to support coherence of shared data access between systems.

While the invention has been described primarily in terms of a tightly coupled multi-processor system, those skilled in the art will recognize that the invention has important applications in multiple processor systems in general and can be practiced with modification within the spirit and scope of the appended claims.

I claim:

1. In a computer system with one or more processors, a shared main storage and a storage control element, each of said processors having a local cache memory and a local cache directory, a method of providing cache accesses comprising the steps of:

providing in said storage control element a logical global access authorization table having entries that contain information for one or more storage blocks of data containing a plurality of lines of data, each block of data containing a plurality of lines of data, a line of data being a basic unit of cache entry, said storage control element controlling assignments of access authorization to blocks of data for processors based on entries in said global access authorization table;

providing, at each processor local cache memory, a local access authorization table, said local access authorization table containing a subset of entries in the global access authorization table, management of the access authorization table differing from management of the cache directory by at least one of number of entries, size of blocks, set-associativity of blocks and replacement policy;

determining by a processor, from its cache directory, if data is resident in said local cache memory;

requesting, by a processor, read or write access to data; and authorizing, by a processor, read or write access to said data in accordance with said requesting step only when the local access authorization table contains an entry access authorization for a block of data including said data for which access is requested.

2. The method recited in claim 1 wherein the entries to said global access authorization table include for each block of data recorded in a cache memory a block identification, an authorization tag indicating status and a bit-vector for assignment of authorization, there being one bit per processor in said bit-vector indicating which of the processors are granted current authorization, further comprising the step of assigning said authorization tag for each block of data recorded in cache memory as VALID or INVALID.

3. The method recited in claim 2 further comprising the steps of:

checking by a processor for a VALID authorization tag for requested data in its local access authorization table regardless of whether the requested data is resident in its local cache memory as recorded in its cache directory;

if a VALID authorization tag is not present in its local access authorization table, then sending by the processor to the storage control element a request for assignment of a VALID authorization tag for a block of data including said requested data; and assigning as VALID the authorization tag in the global access authorization table by said storage control element for the block of data including said requested data before granting the processor's request for access.

4. The method recited in claim 3 further comprising the steps of:

when an authorization tag is assigned VALID for a processor, turning ON a bit associated with said processor in said bit-vector in the global access authorization table;

when the processor releases access authorization of a block of data, turning OFF said associated bit in said bit-vector; and when a VALID authorization tag is changed to INVALID in the global access authorization table, changing by said storage control element any existing VALID authorization tags at the local access authorization tables to INVALID prior to changing the authorization tag in the global access authorization table.

5. The method recited in claim 1 wherein the entries to said global access authorization table include for each block of data recorded in a cache memory a block identification, an authorization tag indicating status and a bit-vector for assignment of authorization, there being one bit per processor in said bit-vector indicating which of the processors are granted current authorization, further comprising the step of assigning the authorization tag for each block of data recorded in cache memory as INVALID, READ ONLY or EXCLUSIVE, wherein a block of data may have an assigned authorization tag of READ ONLY for multiple processors but a block of data may have an assigned authorization tag of EXCLUSIVE for a processor only when the block of data does not have an assigned authorized tag of READ ONLY or EXCLUSIVE for any remote processors.

6. The method recited in claim 5 further comprising the steps of:

checking by a processor for a READ ONLY or EXCLUSIVE authorization tag for requested data in its local access authorization table regardless of whether the requested data is resident in its local cache memory as recorded in its cache directory, all data fetches requiring an assigned authorization tag of READ ONLY or EXCLUSIVE and all data writes requiring an assigned authorization tag of EXCLUSIVE;

if a required READ ONLY or EXCLUSIVE authorization tag is not present in its local access authorization table, then sending by the processor to the storage control element a request for assignment of a READ ONLY or EXCLUSIVE authorization tag for a block of data including said requested data; and assigning as READ ONLY or EXCLUSIVE the authorization tag in the global access authorization table by said storage control element for the block of data including said requested data before granting the processor's request for access.

7. The method recited in claim 6 further comprising the steps of:

when an authorization tag is assigned READ ONLY or EXCLUSIVE for a processor, turning ON a bit associated with said processor in said bit-vector in the global access authorization table;

prior to assigning an authorization tag as EXCLUSIVE for a processor, first assigning as INVALID authorization tags assigned as READ ONLY at local access authorization tables of any remote processors;

if the authorization tag in a local access authorization table of a remote processor for a block of data is assigned EXCLUSIVE, signaling the remote processor by said storage control element to release access authorization of the block of data before assigning EXCLUSIVE to an authorization tag for another processor;

when the processor releases a access authorization to a block of data, turning OFF said associated bit in said bit-vector; and when a READ ONLY or EXCLUSIVE authorization tag is changed to INVALID in the global access authorization table, changing by said storage control element any existing READ ONLY or EXCLUSIVE authorization tages at the local access authorization tables to INVALID prior to changing the authorization tag in said global access authorization table.

8. The method recited in claim 5 further comprising the steps of:

initially setting all entries in the global access authorization table and all local access authorization tables to contain null information;

when an entry for a block of data is inserted into the global access authorization table, switching all bits in said bit-vector on;

when one of said processors acquires read only authorization on a block of data, turning on a bit corresponding to said one processor of said bit-vector at the global access authorization table, and setting said authorization tag to READ ONLY status;

when said one processor releases read only access authorization on a block of data, turning off said bit corresponding to said one processor of said bit-vector at the global access authorization table, if present there;

when one of said processors acquires exclusive authorization on a block of data, turning on a bit corresponding to said one processor of said bit-vector at the global access authorization table, turning off all other bits of said bit-vector, setting said authorization tag to EXCLUSIVE status, notifying all other processors with a corresponding bit turned on in said bit-vector at the global access authorization table to assign as INVALID the authorization tag for that block of data in their respective local access authorization tables, and simultaneously granting exclusive access for the block of data to said one processor if the authorization tag was originally assigned READ ONLY;

when one of said processors releases an exclusive access authorization on a block of data, setting said authorization tag to INVALID or READ ONLY; and when an authorization request for a block of data from one of said processors finds, at the global access authorization table at the storage control element, the block with exclusive status for a remote processor, delaying a grant of access authorization until the remote processor has given up its exclusive access authorization.

* * * * *